(12) United States Patent
Zhu et al.

(10) Patent No.: US 10,569,651 B2
(45) Date of Patent: Feb. 25, 2020

(54) SPEED CONTROL AND STEERING CONTROL ASSISTANT BASED ON PITCH STATUS AND ROLL STATUS OF AUTONOMOUS DRIVING VEHICLE

(71) Applicant: Baidu USA LLC, Sunnyvale, CA (US)

(72) Inventors: Fan Zhu, Sunnyvale, CA (US); Qi Kong, Sunnyvale, CA (US); Qi Luo, Sunnyvale, CA (US); Xiang Yu, Sunnyvale, CA (US); Sen Hu, Sunnyvale, CA (US); Li Zhuang, Sunnyvale, CA (US); Liangliang Zhang, Sunnyvale, CA (US); Weicheng Zhu, Sunnyvale, CA (US); Haoyang Fan, Sunnyvale, CA (US); Yajia Zhang, Sunnyvale, CA (US); Guang Yang, San Jose, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 210 days.

(21) Appl. No.: 15/595,529

(22) Filed: May 15, 2017

(65) Prior Publication Data
US 2018/0330173 A1 Nov. 15, 2018

(51) Int. Cl.
*B60K 31/00* (2006.01)
*G06T 17/05* (2011.01)

(52) U.S. Cl.
CPC .......... *B60K 31/0058* (2013.01); *G06T 17/05* (2013.01)

(58) Field of Classification Search
CPC .......... G06K 9/00791; B60K 31/0058; G05D 1/0251; G06T 17/05
See application file for complete search history.

(56) References Cited

U.S. PATENT DOCUMENTS

| | | | | |
|---|---|---|---|---|
| 6,199,001 B1* | 3/2001 | Ohta | ................... | B60K 31/0058 701/409 |
| 6,804,584 B2* | 10/2004 | Tseng | ................. | B60G 17/0162 701/1 |
| 9,255,529 B2* | 2/2016 | Sladek, Jr. | ............ | F02D 11/105 |
| 2005/0181908 A1* | 8/2005 | Eriksson | ............... | B60W 10/06 477/107 |
| 2006/0184299 A1* | 8/2006 | Wu | ....................... | B60G 17/005 701/45 |
| 2007/0112475 A1* | 5/2007 | Koebler | .................... | B60L 3/12 701/1 |

(Continued)

*Primary Examiner* — Thomas E Worden
(74) *Attorney, Agent, or Firm* — Womble Bond Dickinson (US) LLP

(57) ABSTRACT

When generating a control command of an autonomous driving vehicle (ADV), a pitch status and/or a roll status of the road is determined. The control command is adjusted based on the pitch status and the roll status. For example, when an ADV is driving on an uphill or downhill road, a pitch status of the road is determined and a speed control command will be generated based on the pitch status of the road, such that the ADV have a similar acceleration rate as of driving on a flat road. Similarly, when the ADV is driving on a road that is tilted or rolled left or right, a roll status of the road is determined and a steering control command will be generated in view of the roll status of the road, such that the ADV have a similar heading direction as of driving on a flat road.

18 Claims, 10 Drawing Sheets

(56) References Cited

U.S. PATENT DOCUMENTS

| | | | | |
|---|---|---|---|---|
| 2009/0187324 | A1* | 7/2009 | Lu | B60K 31/00 |
| | | | | 701/94 |
| 2011/0208402 | A1* | 8/2011 | Sladek, Jr. | F02D 11/105 |
| | | | | 701/102 |
| 2015/0321670 | A1* | 11/2015 | Johansson | B60W 50/0097 |
| | | | | 701/94 |
| 2015/0362065 | A1* | 12/2015 | Johansson | B60W 30/18072 |
| | | | | 701/65 |
| 2015/0375777 | A1* | 12/2015 | Endo | B62D 5/0466 |
| | | | | 701/41 |
| 2017/0162055 | A1* | 6/2017 | Lehner | B60W 30/0956 |
| 2018/0032217 | A1* | 2/2018 | Kim | G06F 3/0482 |
| 2018/0188739 | A1* | 7/2018 | Tseng | G05D 1/0246 |
| 2018/0326852 | A1* | 11/2018 | Shiozawa | B60L 9/18 |

* cited by examiner

125

| Speed 451 | Slope Status 452 | Control Command 453 | Driving Parameter 454 |
|---|---|---|---|
| ... | ... | ... | ... |
| | | | |
| | | | |
| | | | |
| | | | |
| ... | ... | ... | ... |

FIG. 5

| Speed 501 | Pitch Status 502 | Throttle/Brake Command 503 | Acceleration 504 | |
|---|---|---|---|---|
| ... | ... | ... | ... | |
| 10 m/s | 0 | 20% | 1 m/s^2 | ← 511 |
| 10 m/s | 5% | 20% | 0.8 m/s^2 | ← 512 |
| 10 m/s | 5% | 25% | 1.0 m/s^2 | ← 513 |
| 10 m/s | 5% | 30% | 1.2 m/s^2 | ← 514 |
| ... | ... | ... | ... | |

| Speed 601 | Roll Status 602 | Steering Command 603 | Heading Direction 604 |
|---|---|---|---|
| ... | ... | ... | ... |
| | | | |
| | | | |
| | | | |
| ... | ... | ... | ... |

SPEED CONTROL AND STEERING CONTROL ASSISTANT BASED ON PITCH STATUS AND ROLL STATUS OF AUTONOMOUS DRIVING VEHICLE

TECHNICAL FIELD

Embodiments of the present invention relate generally to operating autonomous driving vehicles. More particularly, embodiments of the invention relate to assisting speed control and steering control of an autonomous driving vehicle based on pitch status and roll status.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. For example, throttle, brake, and steering commands are most important commands in autonomous driving. These commands are generated and issued based on an assumption of a flat road. When a vehicle is driving a sloped road (e.g., uphill or downhill road), the same commands will typically be generated and issued, which may not be desirable.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating an example of a slope status to command mapping table according to one embodiment of the invention FIG. 6A is a block diagram illustrating an example of a pitch status to command mapping table according to one embodiment of the invention.

FIG. 6B is a block diagram illustrating an example of a roll status to command mapping table according to one embodiment of the invention.

DETAILED DESCRIPTION

Figure 1:
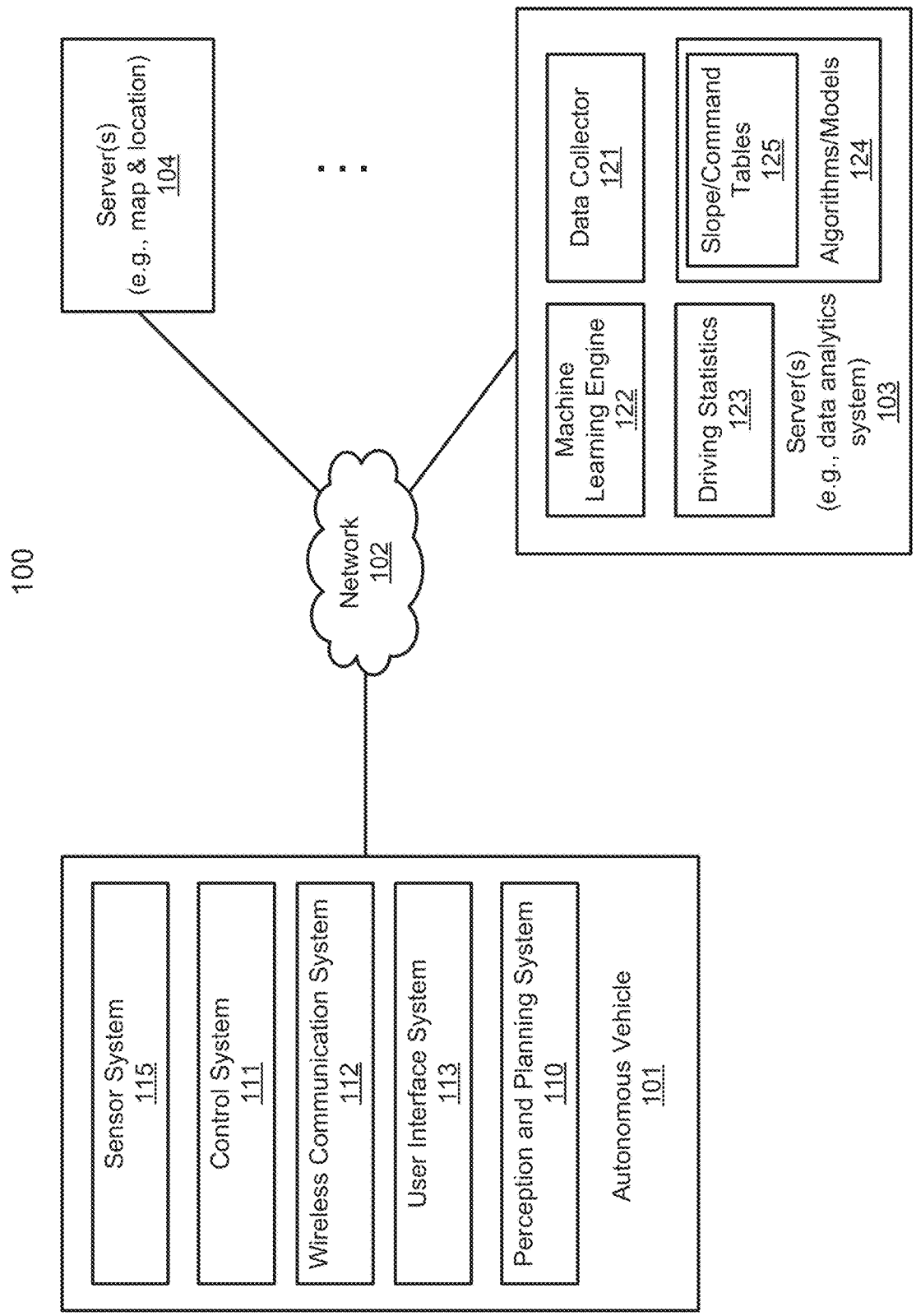
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when generating a control command of an autonomous driving vehicle (ADV), such as a speed control command or a steering control command, a pitch status and/or a roll status (collectively referred to as a slope status) of the road or vehicle is measured and considered. The control command is adjusted or modified based on the pitch status and the roll status, such that a passenger of the ADV would have similar experience as of driving on a flat road. For example, when an ADV is driving on an uphill road or downhill road, a pitch status of the road is determined and a speed control command (e.g., throttle or brake command) will be generated in view of the pitch status of the road, such that the ADV would have a similar acceleration rate as of driving on a flat road. Similarly, when the ADV is driving on a road that is tilted or rolled left or right, a roll status of the road is determined and a steering control command will be generated in view of the roll status of the road, such that the ADV would have a similar heading direction as of driving on a flat road.

In one embodiment, in response to detecting that an ADV is driving on a sloped road (e.g., a longitudinal sloped road such as an uphill/downhill road, a cross sloped road such as a tilted left/right road), a slope status of the road is determined. The slope status may include a pitch status and/or a roll status of the road at the point in time. A lookup operation is performed in a slope status to command (slope/command) mapping data structure such as a table based on a speed of the ADV to locate a first mapping entry having a zero slope status to obtain a first driving parameter corresponding a flat road. A flat road refers to a road with an approximately zero slope status. The slope/command mapping table includes a number of mapping entries. Each mapping entry maps a particular speed of a vehicle and a particular slope status of the vehicle or road to a particular control command issued and a particular driving parameter of the vehicle. In one embodiment, a driving parameter refers to an acceleration rate and/or a heading direction.

Based on the first driving parameter obtained from the first mapping entry, a second mapping entry of the slope/command mapping table is searched and located that approximately matches the speed of the ADV, the slope status of the ADV or road, and the first driving parameter. A control command is then derived from the second mapping entry. The ADV is then controlled based on the control command, such that the ADV is driving on the sloped road with a similar driving parameter as of driving on the flat road, e.g., similar acceleration rate and/or heading direction as of driving on the flat road. As a result, a passenger riding on the ADV driving on the sloped road would have the same or similar experience as of driving on a flat road.

In one embodiment, the slope/command mapping table may be created based on a large amount of driving statistics of a variety of vehicles driving on a variety of different types of roads, including flat roads and sloped roads. The vehicles may be driven autonomously or by a variety of human drivers. The driving statistics may include different control commands (e.g., speed control commands, steering commands) issued and responses of the vehicles (e.g., acceleration/deceleration, heading directions) recorded at different points in times when the vehicles were driving on a variety of different types of roads, including flat roads and sloped roads. In one embodiment, a slope/command mapping table includes a pitch status to command (pitch/command) mapping table and a roll status to command (roll/command) mapping table. The pitch/command mapping table includes a number of pitch mapping entries. Each pitch mapping entry maps a speed of a vehicle and a pitch status of the vehicle or road to a speed control command (e.g., throttle/brake command) and an acceleration/deceleration of the vehicle. The roll/command mapping table includes a number of roll mapping entries. Each roll mapping entry maps a speed of a vehicle and a roll status of the vehicle or road to a steering command and a heading direction or angle of the vehicle.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
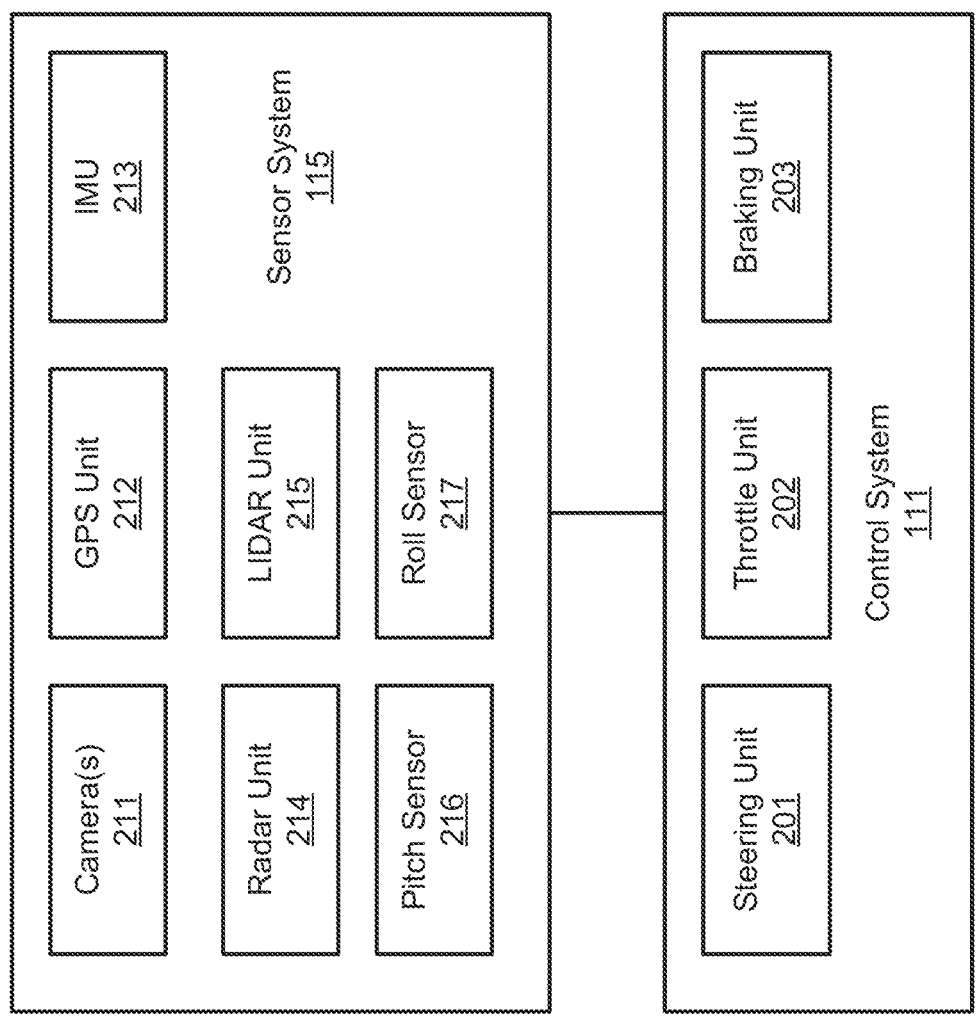
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, sensor system 115 further includes pitch sensor 216 and a roll sensor 217. Pitch sensor 216 is configured to sense and determine a pitch angle of the vehicle, which represents a pitch status of the road. Roll sensor 217 is configured to sense and determine a roll angle of the vehicle, which represents a roll status of the road. Pitch sensor 216 and roll sensor 217 may be integrated as a single sensor. Alternatively, the pitch status and roll status can be determined based on GPS/map information and/or IMU data.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 further include pitch status and roll status of the roads on which the vehicles were driving when the commands and responses of the vehicles were captured. A pitch status or a roll status may be presented by a slope percentage or a slope angle.

Based on driving statistics 123, machine learning engine 122 generates or trains a set of rules, algorithms, and/or predictive models 124 for a variety of purposes. In one embodiment, machine learning engine 122 analyzes driving statistics 123 and generates slope/command mapping tables 125 for a variety of vehicles. A slope/command mapping table includes a number of mapping entries. Each mapping entry maps a particular speed of a vehicle and a particular slope status to a control command and a driving parameter. Note that different slope/command tables may configured for different types of vehicles. Alternatively, a single slope/command table may be configured for multiple types of vehicles. Slope/command mapping tables 125 can then be uploaded onto ADVs to be used in real-time for autonomous driving of the ADVs.

Alternatively, the mapping tables 125 may be implemented as machine learning predictive or determination models. The inputs provided to a predictive or determination model can include a speed of a vehicle and a slope status of the road, and an output of the model can be a control command. There can be a pitch/command predictive model and a roll/command predictive model. Inputs to a pitch/command predictive model can include a speed of a vehicle and a pitch status of the road (e.g., a longitudinal grade/slope percentage or angle), and an output of the pitch/command model can be a speed control command (e.g., throttle or brake command). Inputs to a roll/command predictive model can include a speed of a vehicle and a roll status of the road (e.g., a cross grade/slope percentage or angle), and an output of the roll/command predictive model can be a steering control command.

Figure 3:
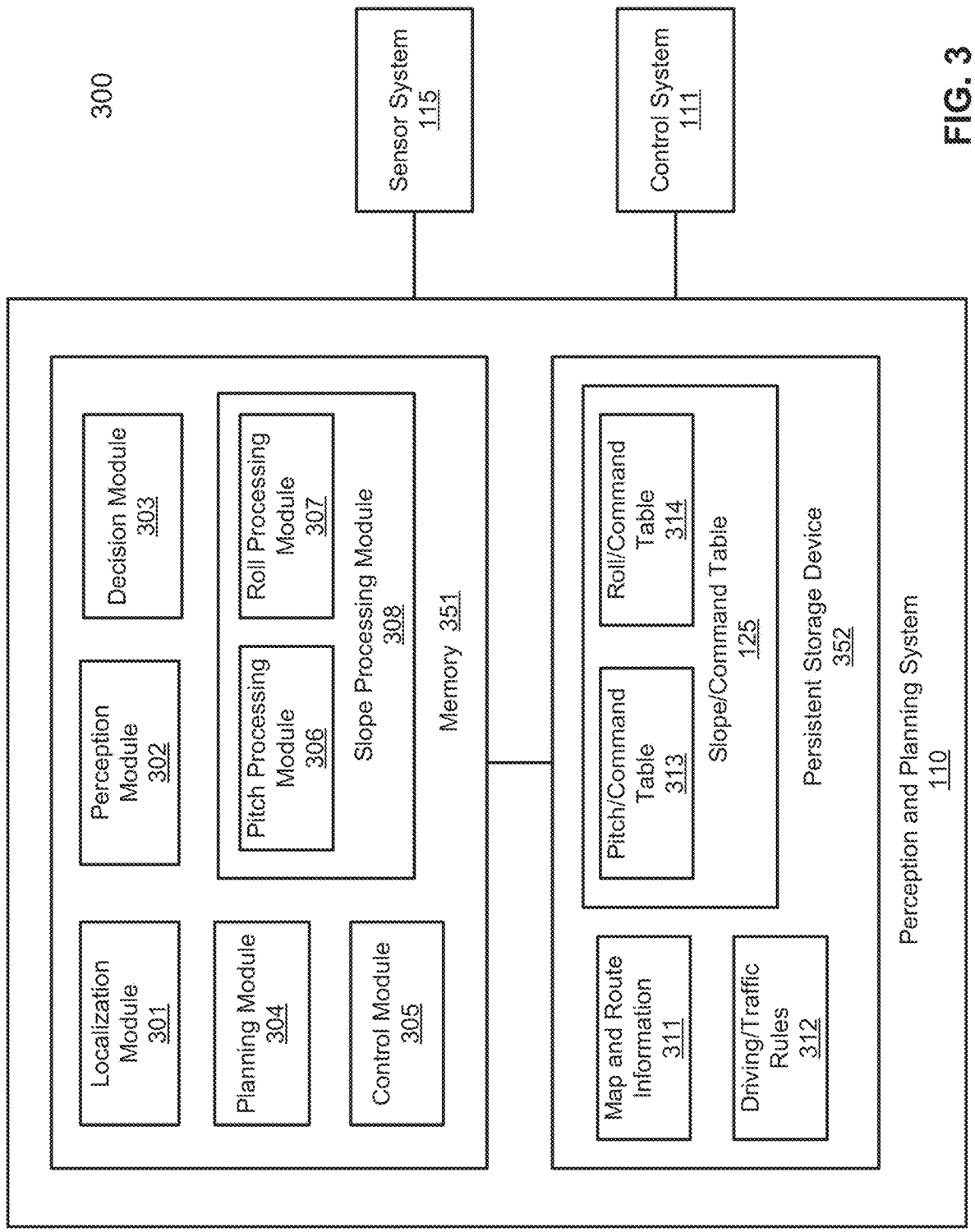
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and slope processing module 308. Slope processing module 308 may include pitch processing module 306 and roll processing module 307 for processing pitch status and roll status respectively.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, pitch processing module 306 and roll processing module 307 may be integrated with control module 305 and/or planning module 304.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, when control module 305 determines a control command to be issued to the ADV, control module 305 invokes slope processing module 308 to determine a slope status of the ADV, which represents a slope status of a sloped road. Slope processing module 308 may obtain the slope data from a slope sensor, such as, for example, pitch sensor 216 and/or roll sensor 217. Alternatively, slope processing module 308 may determine the slope status based on GPS data provided by GPS unit 212 in view of map and route information. Slope processing module 308 can also determine the slope status of the ADV based on IMU data provided by IMU unit 213 and/or LIDAR data provided by LIDAR unit 215. A slope status may be represented in a form of a slope angle or a slope percentage.

Based on the slope status, slope processing module 308 looks up in slope/command mapping table 125, for example, as shown in FIG. 5, based on the slope status and the speed of the ADV to search a first mapping entry that approximately or exactly matches the speed of the ADV corresponding to a flat road (e.g., zero slope status). That is, slope processing module 308 searches the slope/command mapping table 125 to search a mapping entry that matches the current speed of the ADV (by matching field 451), where the mapping entry has a zero slope status (zero slope status in field 452), which represents a flat road. From the first mapping entry, a first driving parameter (e.g., acceleration, heading direction) is obtained.

Based on the first driving parameter, in one embodiment, slope processing module 308 searches again in the slope/command mapping table 125 to locate a second mapping entry that approximately or exactly matches the speed of the ADV (e.g., field 451) and the slope status of the road (e.g., field 452), and having a second driving parameter that approximately or exactly matches the first driving parameter (e.g., field 454). A second control command is obtained from the second mapping entry and presented to control module 305 (e.g., field 453). Control module 305 then determines a final control command based on the second control command obtained from the second mapping entry, where the final control command is then issued to drive the ADV. As a result, the final control command would control the ADV driving on a sloped road with a driving parameter similar to the first driving parameter as of driving on a flat road. The passengers of the ADV would having the same or similar experience as of driving on a flat road.

In one embodiment, if there is no mapping entry that exactly matches the first driving parameter, one or more mapping entries adjacent to the first mapping entry are located that match the speed of the ADV and the slope angle, but have driving parameters closest to the first driving parameter of the first mapping entry. A control command is derived from the control commands of the adjacent mapping entries using a predetermined regression algorithm such as a Gaussian regression algorithm. The derived control command is then used to determine the final control command for controlling the ADV.

For example, based on the first driving parameter, a third mapping entry is searched in slope/command mapping table 125 that matches the speed of the ADV and the slope status of the ADV, and having a third driving parameter below the first driving parameter. A fourth mapping entry is located that matches the speed of the ADV and the slope angle of the ADV, and having a fourth driving parameter above the first driving parameter. The second control command is derived based on a third control command of the third mapping entry and a fourth control command of the fourth mapping entry in view of the third driving parameter and fourth driving parameter respectively. The second control command may be determined between the third control command and the fourth control command in view of a difference between the third driving parameter and the fourth driving parameter using a regression algorithm such as a Gaussian regression algorithm.

Figure 4A:
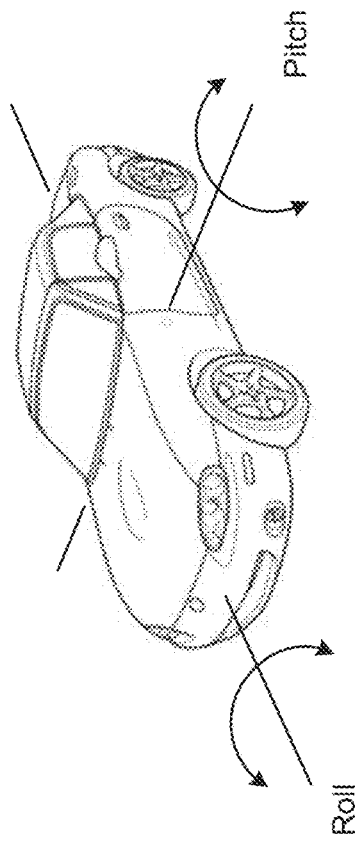
FIGS. 4A-4C are diagrams illustrating slope statuses of vehicles or roads.
Figure 4C:
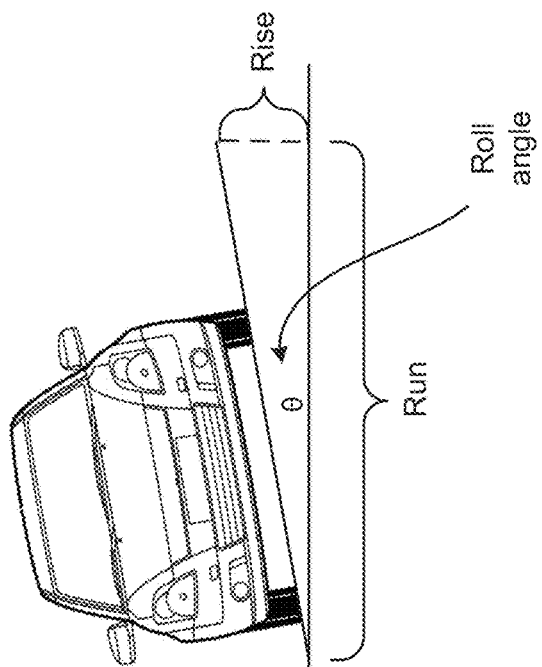
Figure 4B:
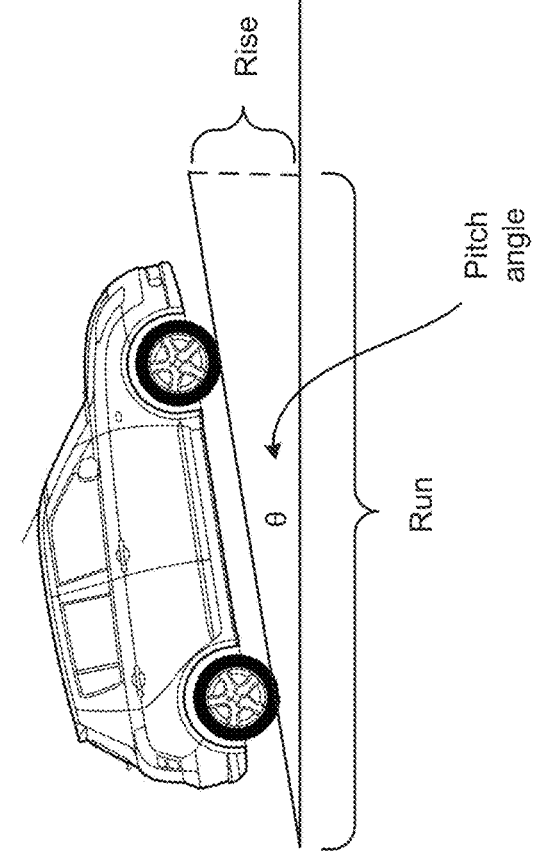

In one embodiment, when control module 305 determines a control command for driving the ADV, pitch processing module 306 and roll processing module 307 are invoked to determine and process pitch status and roll status of the vehicle. Referring now to FIGS. 4A-4C, a pitch status refers to the up and down orientation of the vehicle such as whether the vehicle is positioned on an uphill position or a downhill position. The pitch status may be represented by a pitch slope angle or a pitch grade/slope percentage as shown in FIG. 4B. A positive pitch angle represents an uphill road and a negative pitch angle represents a downhill road, or vice versa. A roll status refers to whether the vehicle is tilted or rolled left or right. The roll status may be represented by a roll slope angle or a roll grade/slope percentage as shown in FIG. 4C. A positive roll angle represents a road tilted left and a negative roll angle represents a road tilted right, or vice versa. A slope angle (θ) can be determined based on a tangent relationship between rise and run, where tan(θ)=rise/run. A slope percentage can be determined by 100*(rise/run). Either a slope angle or a slope percentage can be utilized as a pitch status or roll status throughout this application.

Referring back to FIG. 3, according to one embodiment, pitch processing module 306 determines a pitch status of the ADV, in this example, a pitch percentage of the ADV. Pitch processing module 306 may communicate with sensor system 115 to determine the pitch percentage of the ADV. Based on the speed of the ADV and the pitch percentage, pitch processing module 306 looks up in pitch/command mapping table 313 to determine a control command such as a speed control command (e.g., throttle command or brake command) for driving on a sloped road with the pitch percentage that would result in a similar driving parameter (e.g., acceleration) as of driving a flat road.

An example of pitch/command mapping table 313 is shown in FIG. 6A according to one embodiment. Referring to FIGS. 3 and 5, according to one embodiment, pitch/command mapping table 313 includes a number of mapping entries. Each mapping entry maps a speed of a vehicle 501 and a pitch status of the vehicle 502 to a speed control command 503 issued at the time and an acceleration of the vehicle 504 in response to the speed control command 503. Pitch status 502 can be a pitch angle or a pitch percentage. In this example, pitch status 502 is represented in a form of a pitch percentage. The data of the entries in pitch/command mapping table 313 may be collected and populated by a data analytics system (e.g., data analytics system 103) based on a large amount of driving statistics collected from a variety of vehicles driving at different points in time. Speed control command 503 can be a throttle command or a brake command. In one embodiment, a positive speed control command represents a throttle command and a negative speed control command represents a brake command. Similarly, a positive value of acceleration 504 represents an acceleration of the vehicle while a negative value of acceleration 504 represents a deceleration of the vehicle.

In one embodiment, pitch processing module 306 searches based on the current speed of the ADV to locate a first mapping entry corresponding to a flat road. A flat road refers to a road with zero pitch angle or pitch percentage specified in field 502. In this example, entry 511 corresponds to a flat road that matches a current speed of 10 meters per second (m/s) of the ADV specified in field 501. From entry 511, a first driving parameter is obtained from field 504, in this example, an acceleration of 1 meter per square second (m/s²).

Once the first driving parameter has been obtained, pitch processing module 306 searches for a second mapping entry that approximately matches the speed of the ADV, the pitch status of the ADV, and the first driving parameter. The ideal goal is to find a mapping entry that exactly matches the speed of the ADV, the pitch status of the ADV, and the first driving parameter. In this example, mapping entry 513 is found that exactly matches the speed of the ADV, the pitch status of the ADV, and the first driving parameter. From mapping entry 513, a speed control command is obtained from field 503 of mapping entry 513, in this example, 25% throttle percentage. The speed control command obtained from the second mapping entry is then utilized by control module 305 to derive the final speed control command to drive the ADV. As a result, the ADV would drive in a similar acceleration on a sloped road as of driving on a flat road, and the passengers would have the same or similar experience as of driving on the flat road.

The above scenario is performed in an ideal situation in which mapping entry 513 exists that exactly matches the speed of the ADV, the pitch status of the ADV, and the first driving parameter. However, in some situations, there may not be a mapping entry that exactly matches the speed of the ADV, the pitch status of the ADV, and the first driving parameter. Assuming mapping entry 513 does not exist, according to another embodiment, the adjacent or neighboring mapping entries such as entries 512 and 514 may be selectively utilized to derive the speed control command.

Assuming entry 513 does not exist, according to one embodiment, pitch processing module 306 searches and finds a third mapping entry that approximately matches the speed of the ADV and the pitch status of the ADV, and a driving parameter of the third mapping entry is closest to but below the first driving parameter. In this example, mapping entry 512 matches the speed and slope status of the ADV, with driving parameter of 0.8 m/s² is closest to but below the first driving parameter of 1.0 m/s² of mapping entry 511. Pitch processing module 306 then searches and finds a fourth mapping entry that approximately matches the speed of the ADV and the pitch status of the ADV, and a driving parameter of the fourth mapping entry is closest to but above the first driving parameter. In this example, mapping entry 514 matches the speed and slope status of the ADV, with driving parameter of 1.2 m/s² is closest to but above the first driving parameter of 1.0 m/s² of mapping entry 511.

A speed control command for driving the ADV can then be derived from the speed control command 503 of mapping entry 512 and speed control command 503 of mapping entry 514 in view of the third driving parameter 504 of mapping entry 512 and the fourth driving parameter 504 of mapping entry 514. In one embodiment, the speed control command (e.g., 25 throttle percentage) may be derived using a regression algorithm or model, such as the Gaussian regression algorithm, based on the speed control commands 503 and driving parameters 504 of mapping entries 512 and 514.

The above techniques can also be utilized to determine steering commands for driving on a cross-sloped road. For example, according one embodiment, roll processing module 307 can utilize the information obtained from roll/command mapping table 314 as shown in FIG. 6B to determine or derive a steering command for driving the ADV on a cross-sloped road using techniques similar to the techniques described above. Referring to FIG. 6B, roll processing module 307 searches a first mapping entry that matches speed of the vehicle 601 and roll status 602 of zero, which represents a driving scenario of a flat road. From the first mapping entry, heading direction 604 is obtained. Roll processing module 307 then searches for a second mapping entry that approximately matches the speed of the vehicle 601, roll status of the vehicle 602, and heading direction 604 of the first mapping entry. A steering control command for driving the vehicle is then determined based on steering command 603 of the second mapping entry. Alternatively, if there is no matching second entry found, the steering command is then derived from adjacent entries as described above. As a result, the ADV would drive with the same or similar heading direction on a cross-sloped road as of driving on a flat road, and the passengers would have the same or similar experience.

Note that mapping tables or data structures are utilized to describe the embodiments of the invention. However, the mapping tables can be implemented as a part of a machine-learning predictive or determination models. The inputs provided to a predictive or determination model can include a speed of a vehicle and a slope status of the road, and an output of the model can be a control command. There can be a pitch/command predictive model and a roll/command predictive model. Inputs to a pitch/command predictive model can include a speed of a vehicle and a pitch status of the road (e.g., a longitudinal grade/slope percentage or angle), and an output of the pitch/command model can be a speed control command (e.g., throttle or brake command). Inputs to a roll/command predictive model can include a speed of a vehicle and a roll status of the road (e.g., a cross grade/slope percentage or angle), and an output of the roll/command predictive model can be a steering control command.

Figure 7:
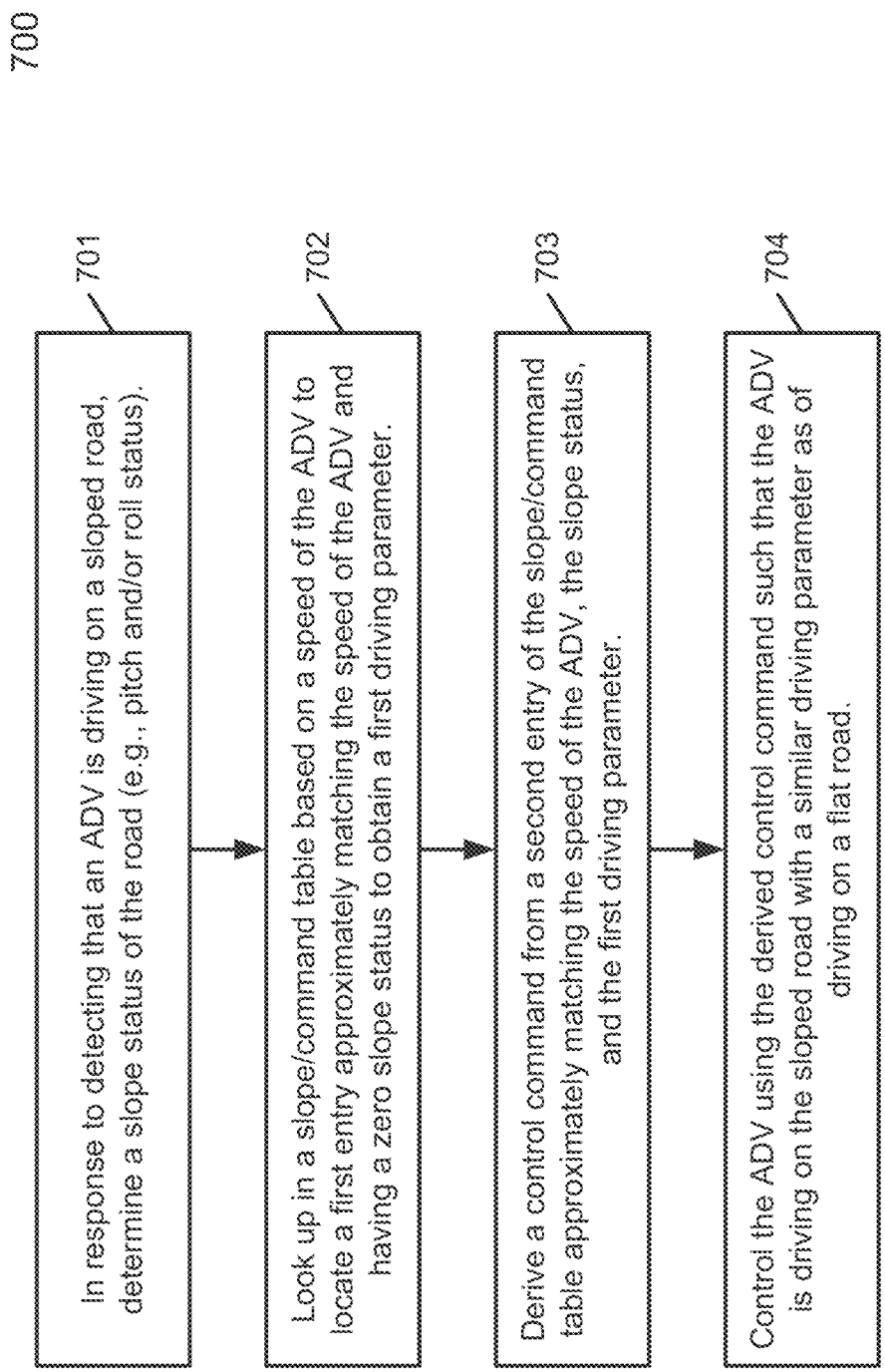
FIG. 7 is a flow diagram illustrating a process of operating an autonomous driving vehicle according to one embodiment of the invention.

FIG. 7 is a flow diagram illustrating a process of operating an autonomous driving vehicle according to one embodiment of the invention. Process 700 may be performed by processing logic which may include software, hardware, or a combination thereof. For example, process 700 may be performed by control module 305, pitch processing module 306, and/or roll processing module 307. Referring to FIG. 7, in operation 701, in response to detecting that an ADV is driving on a sloped road, processing logic determines a slope status of the road or vehicle. The slope status may include a pitch status and/or a roll status. The processing logic may communicate with a slope sensor such as a pitch sensor and/or a roll sensor to determine the slope status, which may be represented in a form of a slope angle or slope/grade percentage.

In operation 702, processing logic looks up in a slope/command mapping table based on a speed of the ADV to find a first mapping entry that approximately matches the speed of the ADV and have a zero slope status representing a flat road. The slope/command mapping table includes a number of mapping entries. Each mapping entry maps a particular speed of a vehicle and a particular slope status to a particular control command and a particular driving parameter. A first driving parameter is obtained from the first mapping entry, where the first driving parameter may represent an acceleration or a heading direction of a vehicle. In operation 703, processing logic searches a second mapping entry that approximately matches the speed of the ADV, the slope status of the ADV, and the first driving parameter. A control command (e.g., speed control command or a steering command) is derived from the second mapping entry. In operation 704, the ADV is controlled based on the derived control command such that the ADV is driving on the sloped road with a similar driving parameter as of driving on the flat road.

Figure 8:
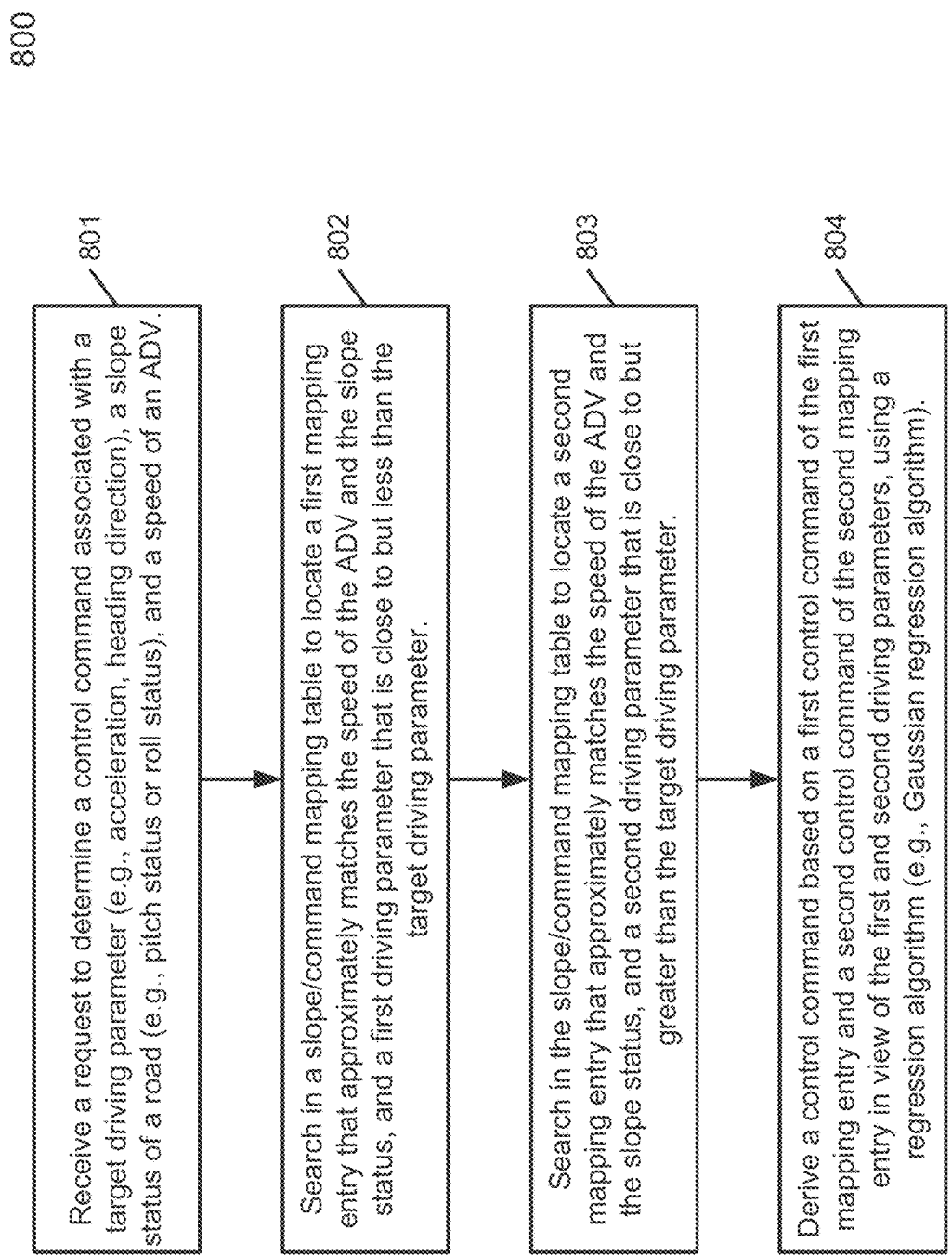
FIG. 8 is a flow diagram illustrating a process of operating an autonomous driving vehicle according to another embodiment of the invention.

FIG. 8 is a flow diagram illustrating a process of operating an autonomous driving vehicle according to another embodiment of the invention. Process 800 may be performed by processing logic which may include software, hardware, or a combination thereof. For example, process 800 may be performed as a part of operation 703 of FIG. 7. Referring to FIG. 8, in operation 801, processing logic receives a request for determining a control command that is associated with a target driving parameter (e.g., acceleration, heading direction), a slope status of a road (e.g., pitch status, roll status), and a speed of an ADV. The target driving parameter may be obtained from a mapping entry of a slope/command mapping table corresponding to a flat road obtained as a part of operation 702 as described above.

In operation 802, processing logic searches in the slope/command mapping table to locate a first mapping entry that approximately matches the speed of the ADV and the slope status of the road, and a first driving parameter that is close to but less than the target driving parameter. In operation 803, processing logic searches in the slope/command mapping table to locate a second mapping entry that approximately matches the speed of the ADV and the slope status of the road, and a second driving parameter close to but greater than the target driving parameter. In operation 804, a control command is derived from a first control command obtained from the first mapping entry and a second control command obtained from the second mapping entry in view of the first and second driving parameters, using a predetermined regression algorithm such as a Gaussian regression algorithm.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
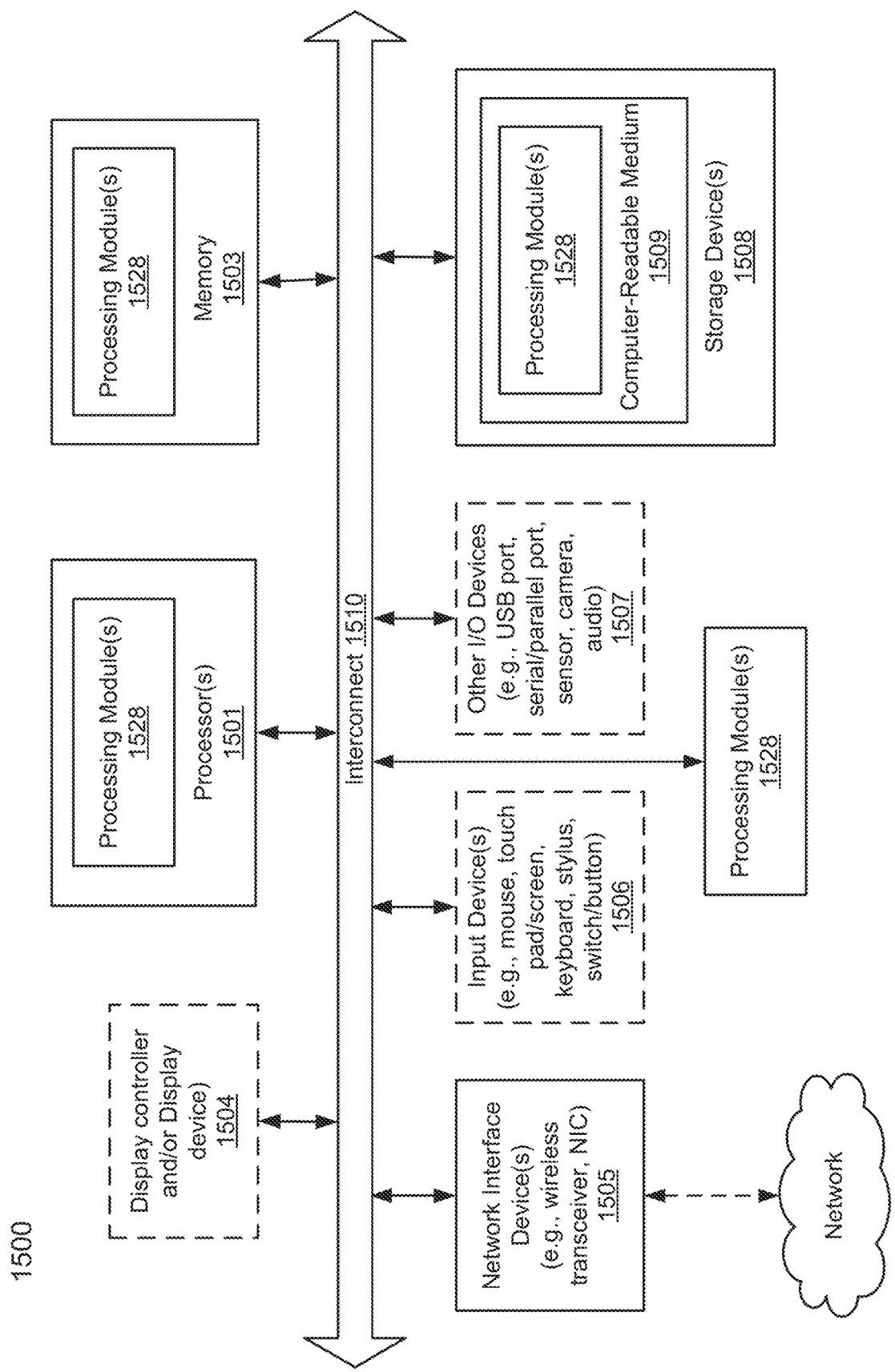
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s)

1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein.

Processing module/unit/logic 1528 may represent any of the components described above, such as, for example, planning module 304, control module 305, and/or slope processing module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
in response to detecting that an ADV is driving on a sloped road, determining a slope status of the road;
performing a lookup operation in a slope status to command (slope/command) mapping table based on a speed of the ADV;
in response to the lookup operation, locating a first mapping entry in the slope/command table and obtaining a first driving parameter from the first mapping entry, wherein the first mapping entry matches the speed of the ADV and includes a zero slope status representing a flat road;
deriving a first control command from a second mapping entry of the slope/command mapping table, wherein the second mapping entry matches the speed of the ADV, the slope status of the road, and the first driving parameter obtained from the first mapping entry, wherein deriving the first control command from the second mapping entry of the slope/command mapping table comprises:
locating a third mapping entry having a speed matching the speed of the ADV, a slope status matching the slope status of the road, and a second driving parameter equal to or less than the first driving parameter of the first mapping entry;
locating a fourth mapping entry having a speed matching the speed of the ADV, a slope status matching the slope status of the road, and a third driving parameter equal to or greater than the first driving parameter of the first mapping entry; and
deriving the first control command based on a second control command obtained from the third mapping entry and a third control command obtained from the fourth mapping entry; and
controlling the ADV using the first derived control command such that the ADV is driving on the sloped road as if driving on the flat road.

2. The method of claim 1, wherein the slope/command mapping table comprises a plurality of mapping entries, wherein each mapping entry maps a particular speed and a particular slope status to a particular control command and a particular driving parameter.

3. The method of claim 1, wherein deriving the first control command based on the second control command and the third control command comprises deriving the first control command using a linear regression algorithm based on a plurality of control commands associated with a plurality of mapping entries that match the speed of the ADV and the slope status and have a weighted driving parameter derived from both the second driving parameter and the third driving parameter that approximates the first driving parameter.

4. The method of claim 1, wherein the slope/command mapping table is created based on driving statistics of a plurality of vehicles, which are captured while the vehicles are driving on different sloped and flat roads, including capturing speeds, slope statuses, control commands issued, and acceleration or heading directions at different points in time.

5. The method of claim 1, wherein the slope status comprises a pitch status of the road, wherein the first driving parameter comprises a first acceleration, and wherein the derived first control command comprises a speed control command such that the ADV is to drive with comparable acceleration as if driving on the flat road.

6. The method of claim 1, wherein the slope status comprises a roll angle of the road, wherein the first driving parameter comprises a first heading direction, and wherein the derived first control command comprises a steering command such that the ADV is to drive with comparable heading direction as if driving on the flat road.

7. A non-transitory machine-readable medium having instructions stored therein, which when executed by a processor, cause the processor to perform operations, the operations comprising:
in response to detecting that an autonomous driving vehicle (ADV) is driving on a sloped road, determining a slope status of the road;
performing a lookup operation in a slope status to command (slope/command) mapping table based on a speed of the ADV;
in response to the lookup operation, locating a first mapping entry in the slope/command table and obtaining a first driving parameter from the first mapping entry, wherein the first mapping entry matches the speed of the ADV and includes a zero slope status representing a flat road;
deriving a first control command from a second mapping entry of the slope/command mapping table, wherein the second mapping entry matches the speed of the ADV, the slope status of the road, and the first driving parameter obtained from the first mapping entry, wherein deriving the first control command from the second mapping entry of the slope/command mapping table comprises:
  locating a third mapping entry having a speed matching the speed of the ADV, a slope status matching the slope status of the road, and a second driving parameter equal to or less than the first driving parameter of the first mapping entry;
  locating a fourth mapping entry having a speed matching the speed of the ADV, a slope status matching the slope status of the road, and a third driving parameter equal to or greater than the first driving parameter of the first mapping entry; and
  deriving the first control command based on a second control command obtained from the third mapping entry and a third control command obtained from the fourth mapping entry; and
controlling the ADV using the first derived control command such that the ADV is driving on the sloped road as if driving on the flat road.

8. The machine-readable medium of claim 7, wherein the slope/command mapping table comprises a plurality of mapping entries, wherein each mapping entry maps a particular speed and a particular slope status to a particular control command and a particular driving parameter.

9. The machine-readable medium of claim 7, wherein deriving the first control command based on the second control command and the third control command comprises deriving the first control command using a linear regression algorithm based on a plurality of control commands associated with a plurality of mapping entries that match the speed of the ADV and the slope status and have a weighted driving parameter derived from both the second driving parameter and the third driving parameter that approximates the first driving parameter.

10. The machine-readable medium of claim 7, wherein the slope/command mapping table is created based on driving statistics of a plurality of vehicles, which are captured while the vehicles are driving on different sloped and flat roads, including capturing speeds, slope statuses, control commands issued, and acceleration or heading directions at different points in time.

11. The machine-readable medium of claim 7, wherein the slope status comprises a pitch status of the road, wherein the first driving parameter comprises a first acceleration, and wherein the derived first control command comprises a speed control command such that the ADV is to drive with comparable acceleration as if driving on the flat road.

12. The machine-readable medium of claim 7, wherein the slope status comprises a roll angle of the road, wherein the first driving parameter comprises a first heading direction, and wherein the derived first control command comprises a steering command such that the ADV is to drive with comparable heading direction as if driving on the flat road.

13. A data processing system, comprising:
  a processor; and
  a memory coupled to the processor to store instructions, which when executed by the processor, cause the processor to perform operations, the operations including:
    in response to detecting that an autonomous driving vehicle (ADV) is driving on a sloped road, determining a slope status of the road;
    performing a lookup operation in a slope status to command (slope/command) mapping table based on a speed of the ADV;
    in response to the lookup operation, locating a first mapping entry in the slope/command table and obtaining a first driving parameter from the first mapping entry, wherein the first mapping entry matches the speed of the ADV and includes a zero slope status representing a flat road;
    deriving a first control command from a second mapping entry of the slope/command mapping table, wherein the second mapping entry matches the speed of the ADV, the slope status of the road, and the first driving parameter obtained from the first mapping entry, wherein deriving the first control command from the second mapping entry of the slope/command mapping table comprises:
      locating a third mapping entry having a speed matching the speed of the ADV, a slope status matching the slope status of the road, and a second driving parameter equal to or less than the first driving parameter of the first mapping entry;
      locating a fourth mapping entry having a speed matching the speed of the ADV, a slope status matching the slope status of the road, and a third driving parameter equal to or greater than the first driving parameter of the first mapping entry; and
      deriving the first control command based on a second control command obtained from the third mapping entry and a third control command obtained from the fourth mapping entry; and
    controlling the ADV using the first derived control command such that the ADV is driving on the sloped road as if driving on the flat road.

14. The system of claim 13, wherein the slope/command mapping table comprises a plurality of mapping entries, wherein each mapping entry maps a particular speed and a particular slope status to a particular control command and a particular driving parameter.

15. The system of claim 13, wherein deriving the first control command based on the second control command and the third control command comprises deriving the first control command using a linear regression algorithm based on a plurality of control commands associated with a plurality of mapping entries that match the speed of the ADV and the slope status and have a weighted driving parameter derived from both the second driving parameter and the third driving parameter that approximates the first driving parameter.

16. The system of claim 13, wherein the slope/command mapping table is created based on driving statistics of a plurality of vehicles, which are captured while the vehicles are driving on different sloped and flat roads, including capturing speeds, slope statuses, control commands issued, and acceleration or heading directions at different points in time.

17. The system of claim 13, wherein the slope status comprises a pitch status of the road, wherein the first driving parameter comprises a first acceleration, and wherein the derived first control command comprises a speed control command such that the ADV is to drive with comparable acceleration as if driving on the flat road.

18. The system of claim 13, wherein the slope status comprises a roll angle of the road, wherein the first driving parameter comprises a first heading direction, and wherein the derived first control command comprises a steering command such that the ADV is to drive with comparable heading direction as if driving on the flat road.

* * * * *